United States Patent [19]

Hornbaker et al.

[11] 4,089,838
[45] May 16, 1978

[54] POLYPIVALOLACTONE MOLDING COMPOUNDS

[75] Inventors: Edwin D. Hornbaker; Jesse D. Jones; Michael E. Kucsma; Thomas S. Allen, all of Baton Rouge, La.

[73] Assignee: Ethyl Corporation, Richmond, Va.

[21] Appl. No.: 816,592

[22] Filed: Jul. 18, 1977

[51] Int. Cl.$^2$ ................................................. C08K 3/10
[52] U.S. Cl. .............................. 260/40 R; 260/78.3 R
[58] Field of Search ........................ 260/40 R, 78.3 R

[56] References Cited

U.S. PATENT DOCUMENTS

| | | | |
|---|---|---|---|
| 3,268,486 | 8/1966 | Klootwijk | 260/78.3 R |
| 3,471,456 | 10/1969 | Klootwijk et al. | 260/78.3 R |
| 3,549,586 | 12/1970 | Smith et al. | 260/40 R |
| 3,734,936 | 5/1973 | Brown et al. | 260/37 R |
| 3,814,725 | 6/1974 | Zimmerman et al. | 260/40 R |
| 3,833,534 | 9/1974 | Tierney et al. | 260/37 N |
| 3,835,089 | 9/1974 | Fox et al. | 260/40 R |

*Primary Examiner*—Eugene C. Rzucidlo
*Attorney, Agent, or Firm*—Donald L. Johnson; John F. Sieberth; David L. Ray

[57] ABSTRACT

Improved thermoplastic compositions comprising a particulate reinforcing filler blended with polypivalolactone, and a process for producing these compositions.

40 Claims, No Drawings

POLYPIVALOLACTONE MOLDING COMPOUNDS

BACKGROUND OF THE INVENTION

This invention relates to improved thermoplastic polyester compositions and a method of producing the compositions. The improved thermoplastic compositions comprise an intimate blend of a particulate reinforcing filler with polypivalolactone. The easily processable thermoplastic compositions of the invention have significant property advantages over other reinforced polyester molding resins.

It is well known that certain properties of thermoplastics, including thermoplastic polyesters, may be enhanced by incorporating reinforcing fillers. For example, U.S. Pat. No. 3,814,725 discloses improved polyester molding resins which are obtained by the intimate blending of reinforcing fillers with polypropylene or polybutylene terephthalate. However, to obtain the degree of strength and resistance to deformation at elevated temperatures necessary for the more demanding engineering thermoplastic applications in parts molded from such thermoplastic polyesters, reinforcing fibers of considerable fiber length, usually of the order of one-eighth to one-half inch, must be incorporated in the molding compositions. Such fiber reinforced compositions exhibit very poor surface appearance, which requires in most applications that parts molded from such compositions be painted to obtain a commercially acceptable product. This undesirable characteristic can be overcome through the use of particulate fillers. However, reinforcement with particulate fillers provides only a moderate improvement in strength and deformation resistance at elevated temperatures and often results in a loss of toughness. There is thus a need for thermoplastic polyester compositions having an improved balance of properties, wherein high temperature strength and deformation resistance are combined with good surface appearance and toughness, and wherein acceptable strength and stiffness at ambient temperatures and good processability are retained.

SUMMARY OF THE INVENTION

In accordance with the present invention there are provided improved polyester thermoplastic compositions and methods for their production by intimately blending polypivalolactone with particulate reinforcing fillers. The thermoplastic compositions of the invention exhibit improved resistance to deformation at elevated temperatures, excellent surface appearance, and improved toughness. Furthermore, the compositions of the invention have a very acceptable degree of strength and stiffness at ambient temperatures, excellent processability, and low mold shrinkage.

DESCRIPTION OF THE PREFERRED EMBODIMENTS

The preparation of polypivalolactone is described in numerous U.S. patents, exemplary of which are U.S. Pat. Nos. 3,268,486 and 3,471,456, which are hereby incorporated by reference. The polypivalolactone useful in the present invention has a preferred viscosity range, the viscosity being indicated by the limiting viscosity number (hereinafter referred to as L V N). The L V N is a property well known in the art and is defined in Billmeyer, Textbook of Polymer Science (Interscience, N.Y. 1965), pp. 79–81. L V N was determined herein in benzyl alcohol at 150° C.

The polypivalolactone employed in the present invention preferably has a L V N of from about 0.8 to about 2.5. More preferably, the L V N of the polypivalolactone employed in the present invention ranges from about 0.9 to about 2.3, the most preferred polypivalolactone having a L V N of from about 0.9 to about 1.6.

Fillers useful in the present invention are crystalline or amorphous inorganic particles having a certain range of particle sizes, particle size distributions and aspect ratios. The term particulate fillers as used herein refers to acicular, plate-like, or somewhat fibrous particles having a maximum particle size of about 900 microns, the particle size of the filler being the largest dimension of the filler particle. The shape of the particulate fillers of the present invention may vary from somewhat plate-like to somewhat tubular or oblong. The term aspect ratio is defined as the ratio of the length of the particle to its diameter in the case of acicular or somewhat fibrous particles, but in the case of plate-like particles (particles shaped somewhat like a plate) the aspect ratio (usually referred to as "flake aspect ratio") is defined as the ratio of the average particle diameter to its thickness. Generally, the particulate fillers of this invention will have aspect ratios of up to about 300, although there is no upper limitation on this ratio insofar as utility according to this invention. In contrast to the term particulate, the term fiber as used herein refers to particles having maximum particle sizes substantially greater than 900 microns and aspect ratios far greater than 300.

Generally, it is necessary that the particles of the particulate fillers useful in this invention have a maximum particle size of about 900 microns, a maximum average particle size of about 400 microns or less, and an average aspect ratio of at least 10. Preferably, the particles have an average particle size of at least 20 microns when the average aspect ratio is greater than 10 but less than 15, although a median particle size of greater than 8 microns but less than 10 when the average aspect ratio is greater than 10 but less than 15, will result in quite useful properties. It is most preferred, however, that the average particle size be at least about 200 microns but less than 400 microns, the maximum particle size less than 900 microns, and the average aspect ratio at least 30.

Examples of suitable fillers useful in the practice of this invention include crystalline minerals such as alumina, silica, mullite, and graphite; wollastonite, mica, asbestos (such as amosite, chrysotile or crocidolite) and other metal silicates, phosphates, aluminates, aluminosilicates, sulfates, sulfides, carbides, etc.; other inorganic compounds such as potassium titanate, sodium aluminum carbonate, boron carbide, silicon carbide, silicon nitride and tungsten boride; and amorphous materials such as calcium magnesium aluminum silicate. Examples of the more preferred fillers are calcium sulfate single crystal whiskers, potassium titanate single crystals, fibrous calcium magnesium alumina silicate, and asbestos.

The amount of reinforcing filler can range from about 10 weight percent to about 60 weight percent, based on the total weight of the molding compound. Preferably, the reinforcing filler ranges from about 30 weight percent to about 50 weight percent, based on the total weight of the molding compound.

An essential material in the preparation of the reinforced polypivalolactone compositions of the invention is the coupling agent which binds the inorganic filler to the polymer. While a very broad range of silane compounds has been previously used as coupling agents for reinforced thermoplastics, organosilane compounds useful in the present invention are limited to those substituted silanes of the formula

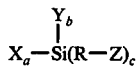

$$X_a-Si(R-Z)_c \atop |Y_b$$

where X is a hydrolyzable group capable of reaction with a hydroxyl group, Y is hydrogen or a monovalent hydrocarbon group, R is a divalent hydrocarbon group having from 1 to about 20 carbon atoms, Z is a primary or secondary amino or epoxy group, "$a$" is an integer from 1 to 3, "$b$" is an integer from 0 to 2, "$c$" is an integer from 1 to 3, and the sum of $a+b+c$ equal 4. Preferably, "$a$" is equal to 3, "$b$" is equal to 0, and "$c$" is equal to 1.

Exemplary of the many suitable X groups include halogen and hydroxy groups as well as alkoxy, cycloalkoxy, aryloxy, alkoxy-substituted alkoxy such as β-methoxyethoxy, alkoxycarbonyl, aryloxycarbonyl, alkyl carboxylate and aryl carboxylate groups, preferably having eight or less carbon atoms, and the like. Exemplary of the many suitable Y groups in the above formula are hydrogen, methyl, ethyl, vinyl, isobutyl, phenyl, other hydrocarbyl groups, preferably having 10 or less carbon atoms, and the like. The R groups can be any divalent hydrocarbon group having up to about 20 carbon atoms, preferably from about 2 to about 18 carbon atoms. Exemplary of the many suitable R groups are ethylene, propylene, isobutylene, decylene, undecylene, octadecylene, phenyl, toluyl, and the like.

The Z group is separated from the silicon atom by an R group having at least two carbon atoms in the linking chain. Exemplary of suitable Z groups are primary or secondary amino or epoxy groups. Among the Z groups suitable for use herein, the primary amino and the epoxy groups are particularly preferred.

Preferred coupling agents are γ-aminoalkyltrialkoxysilanes such as γ-aminopropyltrimethoxysilane, γ-aminopropyltriethoxysilane, γ-aminobutyltrimethoxysilane, γ-aminobutyltriethoxysilane, γ-aminoundecyltrimethoxysilane, γ-aminoundecyltri-n-butoxysilane, and the like; γ-glycidoxyalkyltrialkoxysilanes such as γ-glycidoxypropyltrimethoxysilane, γ-glycidoxypropyltriethoxysilane, γ-glycidoxypropyltributoxysilane, γ-glycidoxybutyltrimethoxysilane, γ-glycidoxybutyltriethoxysilane, γ-glycidoxybutyltributoxysilane, γ-glycidoxyundecyltrimethoxysilane, γ-glycidoxyundecyltriethoxysilane, γ-glycidoxyundecyltributoxysilane, and the like; N-β-(aminoethyl)-γ-aminoalkyltrialkoxysilanes such as N-β-(aminoethyl)-γ-aminopropyltrimethoxysilane, N-β-(aminoethyl)-γ-aminopropyltributoxysilane, N-β-(aminoethyl)-γ-aminopropyltriethoxysilane, N-β-(aminoethyl)-γ-aminobutyltrimethoxysilane, N-β-(aminoethyl)-β-aminobutyltributoxysilane, N-β-(aminoethyl)-γ-aminobutyltriethoxysilane, N-β-(aminoethyl)-γ-aminoundecyltrimethoxysilane, N-β-(aminoethyl)-γ-aminoundecyltributoxysilane, N-β-(aminoethyl)-γ-aminoundecyltriethoxysilane, and the like; and 3,4-epoxycyclohexylethyltrimethoxysilane.

The concentration of the coupling agent can range from about 0.05 to about 2 weight percent, based on the total weight of the molding compound. Preferably, the coupling agent ranges from about 0.1 to about 1 weight percent, based on the total weight of the molding compound.

Although not essential, it is preferred to use a nucleating agent in the compositions of the present invention to provide maximum toughness. A variety of materials known to be effective as nucleating agents for other crystalline polymers can be used such as metal salts of aromatic or alicyclic carboxylic or sulfonic acids (e.g., lithium benzoate, sodium α-naphthalene sulfonate, sodium cyclohexane carboxylate), salts of aliphatic mono or dibasic carboxylic or sulfonic acids (e.g., sodium caproate, sodium succinate), salts of arylalkyl carboxylic or sulfonic acids (e.g., aluminum phenylacetate), or particulate inorganic materials (clays, silica, titanium dioxide, and the like).

The amount of the nucleating agent can range from about 0.01 to about 3 weight percent based on the total weight of the molding compound. More preferably the nucleating agent ranges from about 0.1 to about 1 weight percent based on the total weight of the molding compound.

In addition to the particulate inorganic filler, a small amount of fiber reinforcement such as glass, carbon, asbestos, metal ceramic or aramid fibers may be incorporated into the compositions of the instant invention for property enhancement without significant deterioration of surface appearance. As mentioned above, the term fiber as used herein refers to particles having maximum particle sizes substantially greater than 900 microns and aspect ratios far greater than 300. To avoid significant deterioration of surface appearance, it is preferred that the amount of fiber not exceed 10 percent of the weight of the total composition. However, this amount of fiber may comprise as much as 15 percent of the weight of the total composition without markedly detracting from surface appearance.

Other additives for appearance and property improvement can be incorporated into the molding compounds of the present invention such as colorants, antioxidants, stabilizers, and the like. Examples of suitable antioxidants are 1,3,5-trimethyl-2,4,6-tris(3,5-di-tert-butyl-4-hydroxybenzyl)benzene and N-phenyl-β-naphthylamine. Examples of suitable stabilizers are dialkyl sulfides such as dilauryl sulfide or dicetyl sulfide.

The particulate reinforcing fillers can be intimately blended with the polypivaloiactone by either dry blending or melt blending, or blending in extruders or other types of mixers. If desired, the reinforcing fillers can be blended with the monomers in the polymerization reaction as long as the polymerization reaction is not adversely affected. Ordinarily, however, it is preferred to subject the intimate blend of reinforcing filler and polymer to a second melt blending step in cases where melt blending of filler and polymer is not done initially. This second melt blending step is desirable to permit the incorporation of other necessary additives uniformly into the polymer-filler blend.

Physical and mechanical properties in the following examples were determined in accordance with ASTM procedures where applicable: Tensile Strength — D638; Tensile Elastic Modulus — D638; Flexural Strength — D790; Flexural Elastic Modulus — D790; Izod Impact — D256; and Heat Distortion Temperature — D648.

The following examples will serve to illustrate the invention. In Examples 1 through 16, shown in the table, blends were prepared by first dispersing a coupling agent and the reinforcing filler in a mixer. The coupling agent-reinforcing filler mixture was then "cured" by heating the mixture in a circulating hot air oven at 95° C for 2 hours to aid the reaction between the coupling agent and the reinforcing filler, and to remove all the volatile substances. The "cured" mixture was mixed with the other ingredients. The mixture was then processed on an injection molding machine into parts suitable for grinding into pellets. The pellets were injection molded into test specimens.

Unless otherwise noted, test specimens used in the following examples were injection molded from spherical pellets ranging from approximately 150-inch to 5/16-inch in diameter. The pellets were molded into test specimens by a New Britain reciprocating screw injection molding machine in which the mold temperature is maintained at about 165° F by a circulating water heat exchanger. The barrel temperatures in the machine were set at about 480° F and test specimens were made with the machine operating semi-automatically with a screw back pressure of about 100 psig, a mold cycle time of about 30 seconds and an injection time of about 1.0 to 1.5 seconds. The initial several specimens of each composition were discarded and only those specimens made after the machine had equilibrated were tested. Surface appearance of all molded specimens was excellent.

TABLE OF EXAMPLES

| | (1 thru 8) | | | | | | | |
|---|---|---|---|---|---|---|---|---|
| | 1 | 2 | 3 | 4 | 5 | 6 | 7 | 8 |
| COMPOSITION (in %): | | | | | | | | |
| Polypivalolactone | 59.53$^a$ | 59.53$^b$ | 59.53$^c$ | — | 59.53$^b$ | 59.53$^b$ | 59.72$^b$ | 59.72$^b$ |
| Polybutylene terephthalate$^d$ | — | — | — | 59.17 | — | — | — | — |
| Calcium magnesium aluminosilicate$^e$ | 39.65 | 39.65 | 39.65 | 40.24 | 39.65 | 39.65 | 39.78 | 39.78 |
| Mica | — | — | — | — | — | — | — | — |
| Wollastonite | — | — | — | — | — | — | — | — |
| Fiberglass, ⅛" strands$^j$ | — | — | — | — | — | — | — | — |
| Epoxy silane | 0.52$^k$ | 0.52$^k$ | 0.52$^k$ | 0.59$^k$ | 0.52$^l$ | — | — | — |
| Amino silane$^m$ | — | — | — | — | — | 0.52 | — | — |
| Titanate coupling agent$^n$ | — | — | — | — | — | — | 0.2 | — |
| Cationic silane$^o$ | — | — | — | — | — | — | — | 0.2 |
| Titanium dioxide | 0.3 | 0.3 | 0.3 | — | 0.3 | 0.3 | 0.3 | 0.3 |
| PHYSICAL PROPERTIES: | | | | | | | | |
| Tensile yield strength at 150° C, psi | 3820 | 3750 | 3030 | 2690 | — | — | — | — |
| Flexural strength at 150° C, psi | 7770 | 7870 | 6230 | 4220 | — | — | — | — |
| Flexural modulus at 150° C, psi | 263 | 280 | 277 | 147 | — | — | — | — |
| Heat Deflection Temperature at 264 psi, ° C | 205 | 208 | 213 | 186 | 206 | 198 | 195 | 175 |
| Izod Impact Strength, notched ⅛" bar, ft.-lb/in. at 23° C | 1.1 | 0.9 | 1.5 | 0.7 | 0.8 | 0.4 | 0.7 | 0.5 |
| Tensile yield strength at 23° C, psi | 8660 | 8510 | 7760 | 9440 | 7150 | 6510 | 5400 | 5210 |
| Flexural strength at 23° C, psi | 16900 | 16400 | 16400 | 18300 | 13000 | 11700 | 8850 | 9430 |
| Flexural modulus at 23° C, psi | 822 | 691 | 831 | 944 | 713 | 734 | 651 | 620 |

| | (9 thru 16) | | | | | | | |
|---|---|---|---|---|---|---|---|---|
| | 9 | 10 | 11 | 12 | 13 | 14 | 15 | 16 |
| COMPOSITION (in %): | | | | | | | | |
| Polypivalolactone | 59.80$^b$ | 59.53$^b$ | 59.53$^b$ | — | 59.70$^b$ | 59.53$^b$ | 59.53$^b$ | 59.53$^a$ |
| Polybutylene terephthalate$^d$ | — | — | — | 59.10 | — | — | — | — |
| Calcium magnesium aluminosilicate$^e$ | 39.90 | — | — | — | — | — | — | 29.74 |
| Mica | — | 39.65$^f$ | 39.65$^g$ | 40.19$^f$ | 39.75$^f$ | — | — | — |
| Wollastonite | — | — | — | — | — | 39.65$^h$ | 39.65$^i$ | — |
| Fiberglass, ⅛" strands$^j$ | — | — | — | — | — | — | — | 9.91 |
| Epoxy silane | — | 0.52$^k$ | 0.52$^k$ | 0.71$^k$ | — | 0.52$^k$ | 0.52$^k$ | 0.52$^k$ |
| Amino silane$^m$ | — | — | — | — | — | — | — | — |
| Titanate coupling agent$^n$ | — | — | — | — | — | — | — | — |
| Cationic silane$^o$ | — | — | — | — | 0.25 | — | — | — |
| Titanium dioxide | 0.3 | 0.3 | 0.3 | — | 0.3 | 0.3 | 0.3 | 0.3 |
| PHYSICAL PROPERTIES: | | | | | | | | |
| Tensile yield strength at 150° C, psi | — | 2280 | 2340 | 2110 | 1990 | 3030 | 2850 | 4990 |
| Flexural strength at 150° C, psi | — | 4480 | 4500 | 5450 | 3850 | 6270 | 6460 | 9220 |
| Flexural modulus at 150° C, psi | — | 151 | 159 | 239 | 111 | 227 | 239 | 356 |
| Heat Deflection Temperature at 264 psi, ° C | 197 | 199 | 203 | 189 | 194 | 202 | 204 | 221 |
| Izod Impact Strength, notched ⅛" bar, ft.-lb/in. at 23° C | 0.6 | 0.6 | 0.5 | 0.5 | 0.6 | 0.8 | 0.6 | 1.3 |
| Tensile yield strength at 23° C, psi | 5150 | 5810 | 5980 | 7850 | 6070 | 6700 | 5850 | 10400 |
| Flexural strength at 23° C, psi | 9410 | 9060 | 9690 | 15200 | 7990 | 13400 | 12400 | 19600 |
| Flexural modulus | | | | | | | | |

| at 23° C, psi | 617 | 527 | 580 | 1170 | 702 | 663 | 529 | 968 |

Footnotes:
<sup>a</sup>LVN = 1.4; stabilized with 0.05 wt. percent of dicetyl sulfide.
<sup>b</sup>LVN = 2.1; stabilized with 0.05 wt. percent of dicetyl sulfide.
<sup>c</sup>LVN = 1.0; stabilized with 0.05 wt. percent of dicetyl sulfide.
<sup>d</sup>Vituf VFR 4884, Goodyear Chemicals, an unfilled grade of polybutylene terephthalate.
<sup>e</sup>Processed Mineral Fiber, Jim Walter Resources, Inc., maximum particle size 600 microns, average particle size 275 microns, average aspect ratio 55.
<sup>f</sup>Suzorite 60S, a phlogopite mica produced by Marietta Resources International, Ltd., maximum particle size 840 microns, average particle size 200 microns, aspect ratio 50.
<sup>g</sup>Suzorite 200S, Marietta Resources International, Ltd., maximum particle size 840 microns, average particle size 200 microns, aspect ratio 50.
<sup>h</sup>Wollastonite F-1, Interpace Corp., maximum particle size <100 microns, average (medium) particle size 22 microns, aspect ratio 13-15.
<sup>i</sup>Wollastonite P-1, Interpace Corp., maximum particle size <75 microns, average (medium) particle size 9 microns, aspect ratio 13-15.
<sup>j</sup>PPG 3080M, PPG Industries, Inc.
<sup>k</sup>A-187, glycidoxypropyltrimethoxysilane, Union Carbide Corp.
<sup>l</sup>A-186, β-(3,4-epoxycyclohexyl)-ethyltrimethoxysilane, Union Carbide Corp.
<sup>m</sup>A-1100, γ-aminopropyltriethoxysilane, Union Carbide Corp.
<sup>n</sup>GT DOPP-138S, titanium di(dioctylpyrophosphate) oxyacetate, Kenrich Petrochemicals, Inc.
<sup>o</sup>Z-6032, N-β-(N-vinylbenzylamino)ethyl-γ-aminopropyltrimethoxy-silane monohydrochloride, Dow-Corning.

Examples 1, 2, and 3 show, when compared with Example 4, the superior strength (as indicated by tensile and flexural strengths at 150° C), deformation resistance at elevated temperature (as indicated by heat deflection temperatures) and toughness (as indicated by Izod impact strengths) of the calcium magnesium aluminosilicate filled polypivalolactone over that of polybutylene terephthalate blended with the same filler.

Examples 5 and 6 show comparable physical properties at ambient temperature to those of Examples 1, 2, and 3 indicating comparable effectiveness of a different epoxysilane coupling agent (Example 5) and of an aminosilane coupling agent.

Examples 7 and 8 show poor strength properties at ambient temperatures of two other types of coupling agents, thus demonstrating importance of either an epoxysilane or an aminosilane as coupling agent.

Example 9 gives a point of reference on properties in absence of a coupling agent, which are poor.

Examples 10 and 11 show the higher deformation resistance of mica reinforced polypivalolactone when compared with mica reinforced polybutylene terephthalate, the properties of which are shown in Example 12. The high temperature strength properties in this case are comparable. With one grade of mica, mica reinforced polypivalolactone (Example 10) is tougher (higher Izod impact).

Example 13 shows the poorer high temperature strength properties and ambient temperature strength obtained with a cationic silane as coupling agent.

Example 14 shows the excellent high temperature strength, deformation resistance (HDT) and toughness of wollastonite reinforced polypivalolactone, which are rather comparable to that of calcium magnesium aluminosilicate reinforced polypivalolactone.

Example 15 shows the good high temperature strength, good deformation resistance at elevated temperatures, and toughness of polypivalolactone reinforced with a finer grade of wollastonite. A comparison of Examples 14 and 15 shows that for a filler, such as wollastonite, having an aspect ratio in the 10-15 range and an average particle size of greater than 20 microns is preferred.

Example 16 shows that some fiber reinforcement (fiberglass in this case) can be incorporated in addition to the mineral filler to enhance properties. The most significant thing here is that the surface appearance of molded specimens having the composition shown was excellent.

We claim:

1. A thermoplastic composition comprising an intimate blend of polypivalolactone, said polypivalolactone has an LVN of from about 0.8 to about 2.5, a particulate reinforcing filler said particulate reinforcing filler has a maximum particle size of about 900 microns, a maximum average particle size of about 400 microns or less, and an average aspect ratio of at least 10, and a coupling agent having the formula

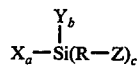

$$X_a-Si(R-Z)_c \atop Y_b$$

where X is a hydrolyzable group capable of reaction with a hydroxyl group, Y is hydrogen or a monovalent hydrocarbon group, R is a divalent hydrocarbon group having from 1 to about 20 carbon atoms, Z is a primary or secondary amino or epoxy group, "a" is an integer from 1 to 3, "b" is an integer from 0 to 2, "c" is an integer from 1 to 3, and the sum of $a + b + c = 4$, said coupling agent comprising from about 0.05 to about 2 weight percent based on the total weight of said composition, and said particulate reinforcing filler comprising from about 10 to about 60 weight percent based on the total weight of said compositions.

2. The thermoplastic composition of claim 1 wherein said coupling agent comprises from about 0.1 to about 1 weight percent based on the total weight of said composition and said reinforcing filler comprises from about 30 weight percent to about 50 weight percent based on the total weight of said composition.

3. The thermoplastic composition of claim 1 wherein said polypivalolactone has an LVN of from about 0.9 to about 2.3.

4. The thermoplastic composition of claim 1 wherein said polypivalolactone has an LVN of from about 0.9 to about 1.6.

5. The thermoplastic composition of claim 1 wherein said particulate reinforcing filler has a maximum particle size of about 900 microns, an average particle size of at least about 200 microns but less than 400 microns, and an average aspect ratio of at least 30.

6. The thermoplastic composition of claim 1 wherein said composition includes from about 0.01 to about 3 weight percent, based on the total weight of said composition, of a nucleating agent.

7. The thermoplastic composition of claim 1 wherein said composition includes reinforcing fibers having particle sizes greater than 900 mircons and aspect ratios greater than 300, said reinforcing fibers comprising not more than 15 percent by weight of the total composition.

8. The thermoplastic composition of claim 1 wherein said composition includes reinforcing fibers having particle sizes greater than 900 microns and aspect ratios greater than 300, said reinforcing fibers comprising not more than 10 percent by weight of the total composition.

9. The thermoplastic composition of claim 1 wherein said particulate reinforcing filler to calcium sulfate single crystal whiskers.

10. The thermoplastic composition of claim 1 wherein said particulate reinforcing filler is potassium titanate single crystals.

11. The thermoplastic composition of claim 1 wherein said reinforcing filler is fibrous calcium magnesium aluminum silicate.

12. The thermoplastic composition of claim 1 wherein said reinforcing filler is asbestos.

13. The thermoplastic composition of claim 1 wherein said reinforcing filler is wollastonite.

14. The thermoplastic composition of claim 1 wherein said reinforcing filler is mica.

15. The thermoplastic composition of claim 1 wherein said coupling agent is a γ-aminoalkyltrialkoxysilane.

16. The thermoplastic composition of claim 1 wherein said couplined agent is γ-aminopropyltriethoxysilane.

17. The thermoplastic composition of claim 1 wherein said coupling agent is a γ-glycidoxyalkyltrialkoxysilane.

18. The thermoplastic composition of claim 1 wherein said coupling agent is γ-glycidoxypropyltrimethoxysilane.

19. The thermoplastic composition of claim 1 wherein said coupling agent is an N-β-(aminoethyl)-γ-aminoalkyltrialkoxysilane.

20. The thermoplastic composition of claim 1 wherein said coupling agent is 3,4-epoxycyclohexylethyltrimethoxysilane.

21. A method for preparing a thermoplastic composition comprising:
a. dispersing a coupling agent on a particulate reinforcing filler, said particulate reinforcing filler has a maximum particle size of about 900 microns, a maximum average particle size of about 400 microns or less, and an average aspect ratio of at least 10, said coupling agent having the formula

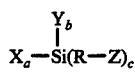

wherein X is a hydrolyzable group capable of reaction with a hydroxyl group, Y is hydrogen or a monovalent hydrocarbon group, R is a divalent hydrocarbon group having from 1 to about 20 carbon atoms, Z is a primary or secondary amino or epoxy group, "a" is an integer from 1 to 3, "b" is an integer from 0 to 2, "c" is an integer from 1 to 3, and the sum of $a + b + c = 4$, said coupling agent comprising from about 0.05 to about 2 weight percent based on the total weight of the composition, and said particulate reinforcing filler comprising from about 10 to about 60 weight percent based on the total weight of the composition,
b. intimately blending said dispersion of coupling agent and particulate reinforcing filler, with polypivalolactone, said polypivalolactone has an LVN of from about 0.8 to about 2.5 and
c. forming said mixture into a solid composition.

22. The method of claim 21 wherein said coupling agent comprises from about 0.1 to about 1 weight percent based on the total weight of the composition and said reinforcing filler comprises from about 30 weight percent to about 50 weight percent based on the total weight of the composition.

23. The method of claim 21 wherein said polypivalolactone has an LVN of from about 0.9 to about 2.3.

24. Th method of claim 21 wherein said polypivalolactone has an LVN of from about 0.9 to about 1.6.

25. The method of claim 21 wherein said particulate reinforcing filler has a maximum particle size of about 900 microns, an average particle size of at least about 200 microns but less than 400 microns, and an average aspect ratio of at least 30.

26. The method of claim 21 wherein said composition includes from about 0.01 to about 3 weight percent, based on the total weight of said composition, of a nucleating agent.

27. The method of claim 21 wherein said composition includes reinforcing fibers having particle sizes greater than 900 microns and aspect ratios greater than 300, said reinforcing fibers comprising not more than 15 percent by weight of the total composition.

28. The method of claim 21 wherein said composition includes reinforcing fibers having particle sizes greater than 900 microns and aspect ratios greater than 300, said reinforcing fibers comprising not more than 10 percent by weight of the total composition.

29. The method of claim 21 wherein said particulate reinforcing filler is calcium sulfate single crystal whiskers.

30. The method of claim 21 wherein said particulate reinforcing filler is potassium titanate single crystals.

31. The method of claim 21 wherein said reinforcing filler is fibrous calcium magnesium aluminum silicate.

32. The method of claim 21 wherein said reinforcing filler is asbestos.

33. The method of claim 21 wherein said reinforcing filler is wollastonite.

34. The method of claim 21 wherein said reinforcing filler is mica.

35. The method of claim 21 wherein said coupling agent is a γ-aminoalkyltrialkoxysilane.

36. The method of claim 21 wherein said coupling agent is γ-aminopropyltriethoxysilane.

37. The method of claim 21 wherein said coupling agent is a γ-glycidoxyalkyltrialkoxysilane.

38. The method of claim 21 wherein said coupling agent is γ-glycidoxypropyltrimethoxysilane.

39. The method of claim 21 wherein said coupling agent is an N-β-(aminoethyl)-γ-aminoalkyltrialkoxysilane.

40. The method of claim 21 wherein said coupling agent is 3,4-epoxycyclohexylethyltrimethoxysilane.

* * * * *

UNITED STATES PATENT OFFICE
CERTIFICATE OF CORRECTION

PATENT NO. : 4,089,838

DATED : May 16, 1978

INVENTOR(S) : Edwin D. Hornbaker, et al

It is certified that error appears in the above-identified patent and that said Letters Patent are hereby corrected as shown below:

Column 4, line 48, "polypivaloiactone" should read -- polypivalolactone --.
Column 5, line 14, "150-inch" should read -- 1/8-inch --.
Column 9, line 10, "to" should read -- is --.
Column 9, line 28, "couplined" should read -- coupling --.

Signed and Sealed this

Second Day of January 1979

[SEAL]

Attest:

RUTH C. MASON
Attesting Officer

DONALD W. BANNER
Commissioner of Patents and Trademarks